United States Patent [19]

Hawkins

[11] 3,864,562
[45] Feb. 4, 1975

[54] MEANS FOR ILLUMINATING UNDERWATER AREAS OF SWIMMING POOLS

[76] Inventor: Donald K. Hawkins, 5 Victory Ct., East Norwalk, Conn. 06855

[22] Filed: Oct. 19, 1973

[21] Appl. No.: 408,163

[52] U.S. Cl............ 240/26, 240/10.6 CH, 240/52.2
[51] Int. Cl...... F21p 1/00, F21v 25/04, F21v 31/00
[58] Field of Search............ 240/26, 52.2, 10.6 CH, 240/2 LC

[56] References Cited
UNITED STATES PATENTS

| | | | |
|---|---|---|---|
| 2,275,299 | 3/1942 | Hummert | 240/52.2 |
| 2,931,895 | 4/1960 | Wagenhauser | 240/26 X |
| 3,120,632 | 2/1964 | Hopt et al. | 240/10.6 CH X |
| 3,329,810 | 7/1967 | Meagher | 240/26 X |
| 3,441,957 | 4/1969 | Friedman | 240/26 |
| 3,500,037 | 3/1970 | Starck | 240/26 X |
| 3,502,861 | 3/1970 | Evans | 240/26 |

OTHER PUBLICATIONS
Westinghouse Swimming Pool Lighting – Aug. 1936.

Primary Examiner—Joseph F. Peters, Jr.
Attorney, Agent, or Firm—H. Gibner Lehmann; K. Gibner Lehmann

[57] ABSTRACT

An underwater safety light for illuminating water-filled pools, comprising a low voltage sealed beam incandescent lamp carried in a watertight plastic casing, means carried by the casing for mounting it to an inside wall of a pool below the waterline thereof, current carrying lines passing through the wall of the casing and sealed thereto, a low voltage battery located exteriorly of the pool and disposed in a weathertight casing, means for charging the battery, and safety means for disconnecting the lamp from the battery and connecting the latter with the charger for positively electrically isolating the lamp from the battery during charging thereof. The mounting means comprises a suction cup carried by the lamp casing for sealingly engaging an inside wall of the pool, thus providing a permanent mounting for the lamp. The safety means comprises a male electrical connector fitting connected with the battery, a mating female connector fitting connected with the battery charger, and an additional female connector fitting connected with the current carrying lines to the lamp, such that the battery can be connected either with the lamp, or with the charger, but not both simultaneously. By such an arrangement, the lamp is electrically isolated from the charger and battery when charging of the latter is occurring.

9 Claims, 7 Drawing Figures

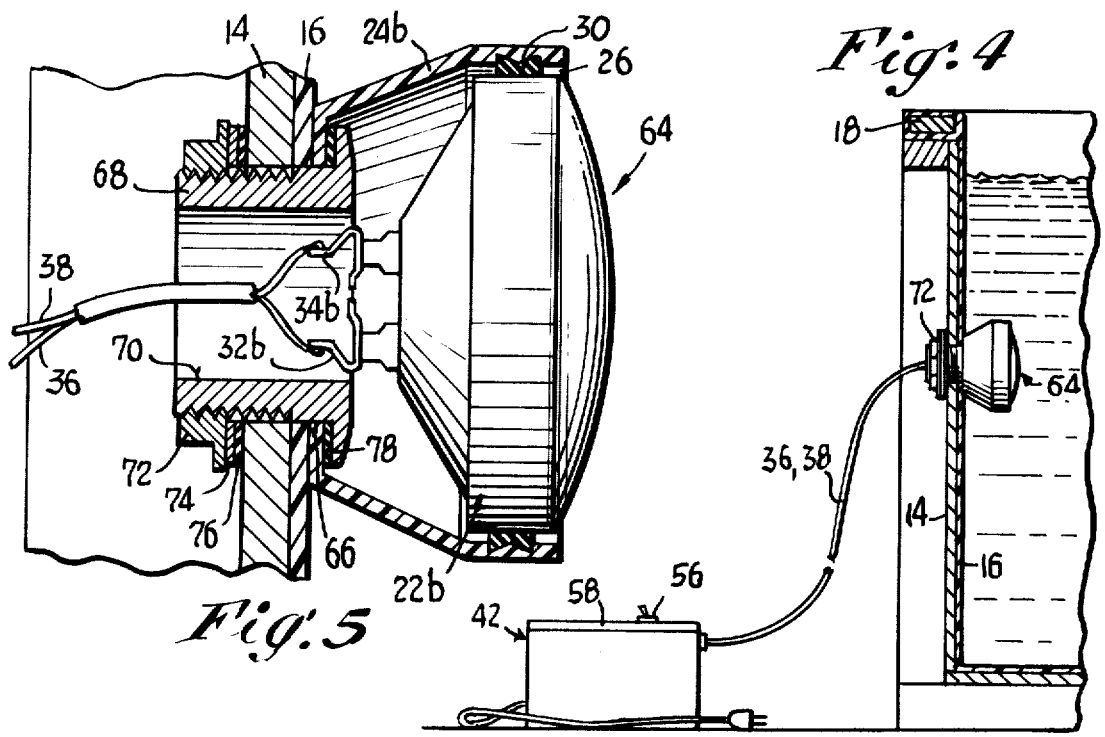
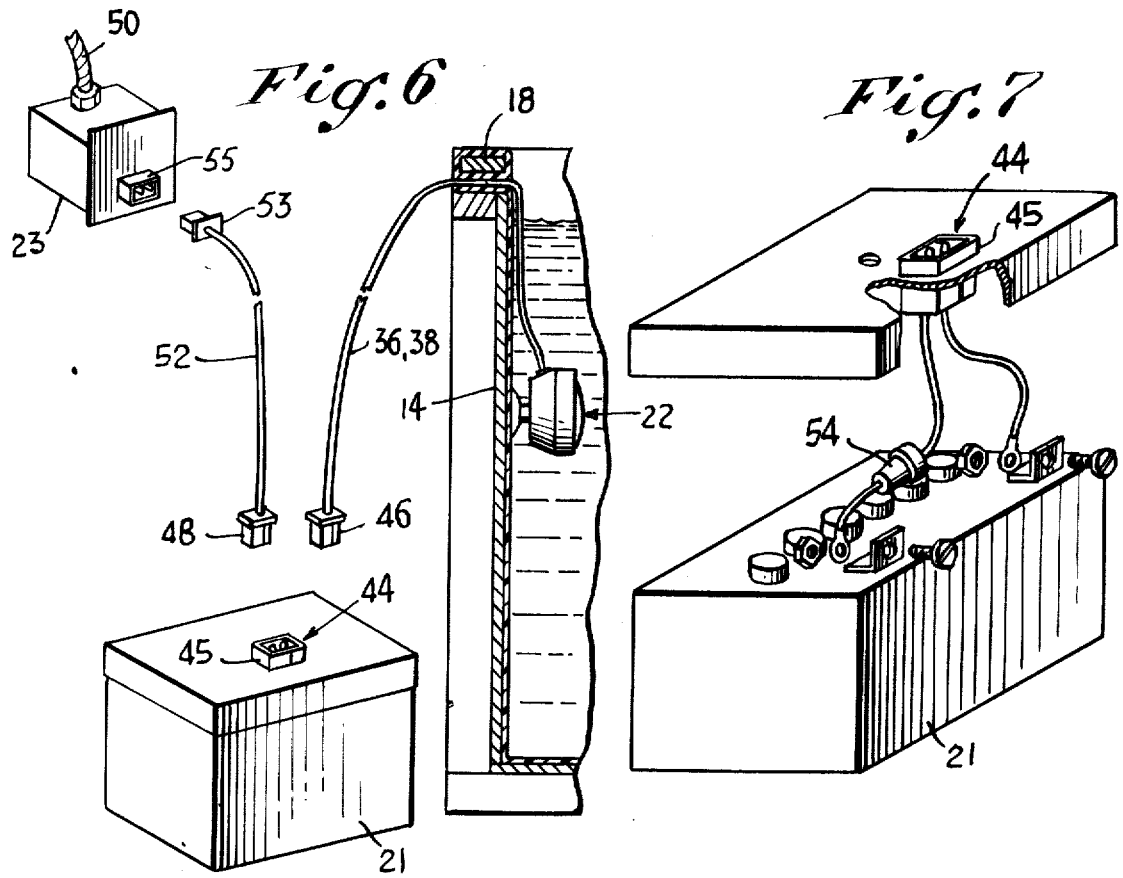

MEANS FOR ILLUMINATING UNDERWATER AREAS OF SWIMMING POOLS

BACKGROUND

This invention relates generally to underwater illumination devices and more particularly to devices which can be easily installed in existing pools and without major modification to the pool structure. In the past, underwater illumination for swimming pools has presented a safety hazard, due to the fact that in most installations, the light is powered either directly from A.C. commercial power mains or indirectly therefrom through a transformer. In the latter case, there was usually provided adequate protection due to the good isolation between the primary and secondary windings of the transformer. However, under certain circumstances, as where the transformer became aged or was exposed to moisture, a leakage path from primary to secondary could develop, and a potentially dangerous voltage (to ground) could occur at the lamp itself (in the pool), resulting in possible hazard to personnel occupying the pool. In addition, for existing structures, the installation of auxiliary lights below the water level was sometimes inconvenient, often requiring that the pool be partially drained first to permit access to the proposed location of the light.

SUMMARY

The above drawbacks and disadvantages of prior auxiliary underwater lighting devices are obviated by the present invention which has for an object the provision of an improved method and auxiliary means attachable to existing pools for safely and economically illuminating the underwater areas thereof. The improved means of the invention comprises a simplified low voltage auxiliary sealed light which is extremely safe and which at no time can present a shock hazard to personnel in the pool, even if a severe equipment malfunction occurs. A related object is the provision of a safety light as above characterized which is simple on construction, reliable in operation, and which can be easily installed by the unskilled person with a minimum of modification to the existing pool structure. Another object is the provision of a safety light which can be easily installed and removed with a minimum of time and effort. The above objects are accomplished by the provision of an underwater safety light comprising a novel combination of a sealed beam incandescent lamp powered by a low voltage battery and safety maintenance charger therefor, the lamp having means for readily mounting it to an inner wall of the pool. The battery is located exteriorly of the pool, and current carrying low voltage lines extend therefrom over the side wall of the pool and down to the location of the lamp. The voltage exciting the lamp is sufficiently low so as to present no shock hazard to personnel in the pool even in the event that someone inadvertently comes in contact with a bared wire. Safety means are provided for disconnecting the lamp from the battery when the latter is to be charged from commercial power mains. The lamp and its connecting lines are completely electrically isolated when such charging is occurring, thus providing absolute safety from the standpoint of shock hazard even in the event of an equipment malfunction.

Other features and advantages will hereinafter appear.

In the figures, illustrating several embodiments of the invention:

FIG. 4 is a vertical section of a pool and safety light constituting another embodiment of the invention, wherein the lamp is adapted for mounting in a hole in the pool wall.

FIG. 5 is a vertical section of the safety light of FIG. 4.

FIG. 6 is a diagramatic representation of the battery, charger and lamp arrangement. The lamp is shown mounted on the wall of a pool (illustrated in vertical section).

FIG. 7 is a perspective view of the storage battery and cover, the latter being broken away to illustrate details of the connector fitting.

Figure 1:
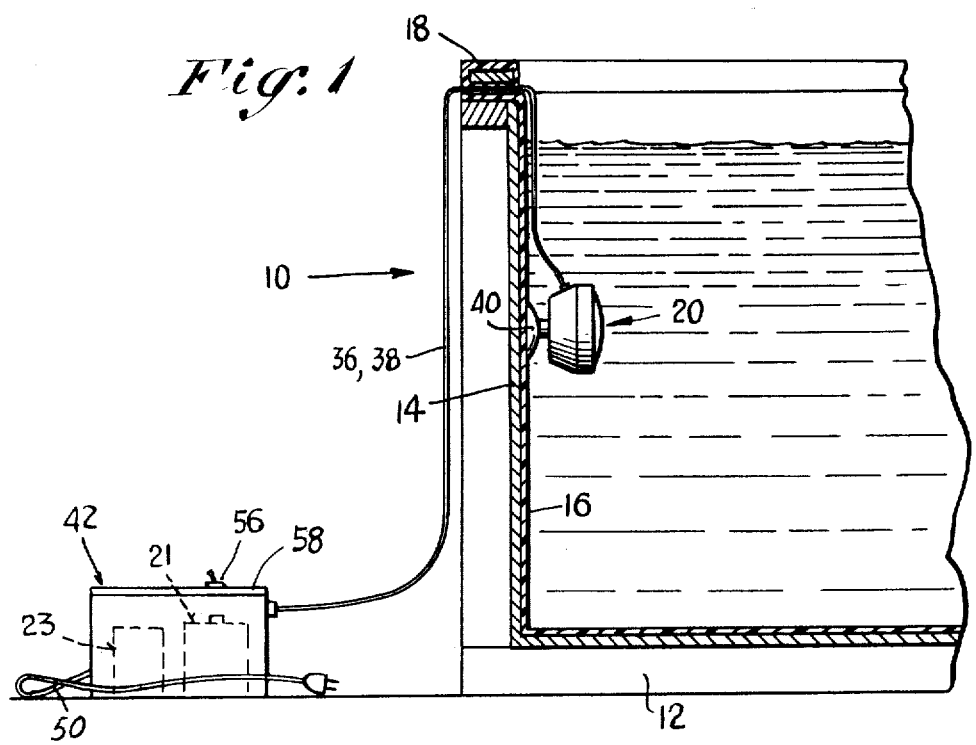
FIG. 1 is a vertical section of a pool illustrating a safety light mounted by means of a suction cup on an inner wall of the pool, the light constituting one embodiment of the invention.

Referring to FIG. 1 there is illustrated a waterfilled pool generally designated by the numeral 10, having a frame 12, a rigid vertical wall portion 14 and an inner wall or liner 16 of water impervious material such as vinyl. A railing or saddle member 18 overlies the top edge of the wall portion.

Figures 2, 3:
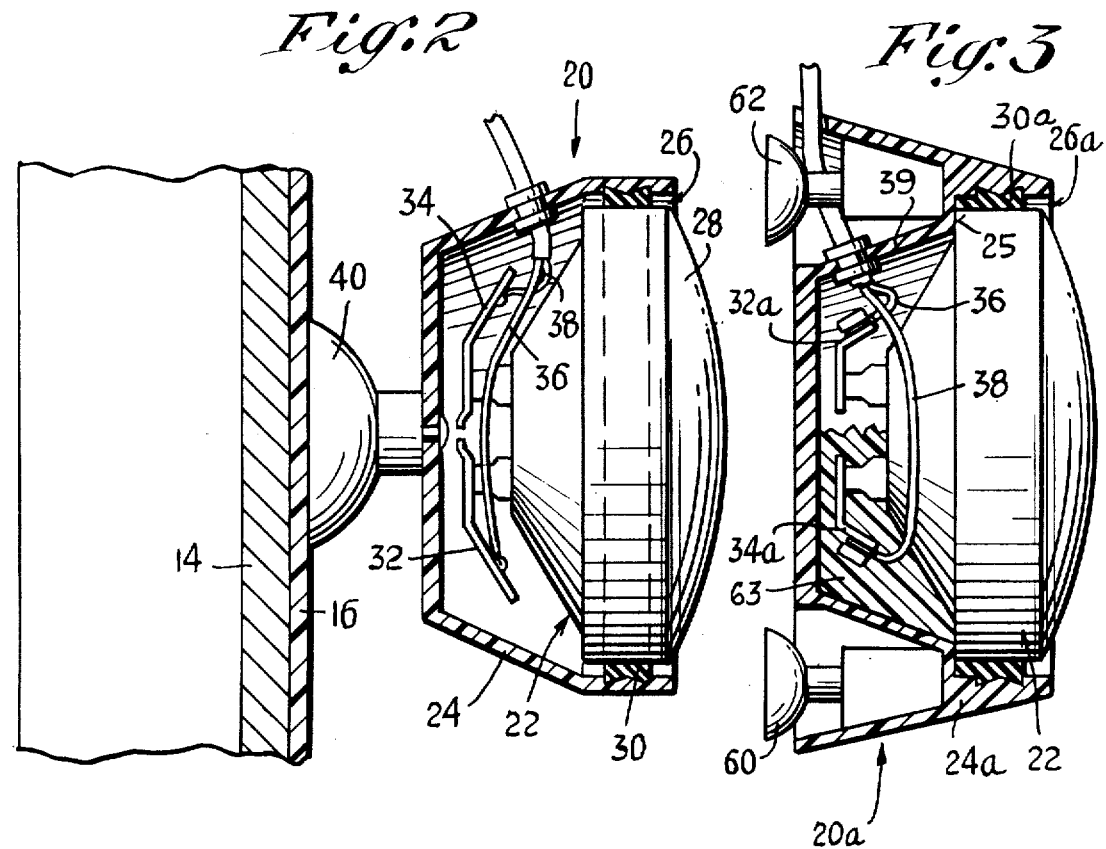
FIG. 2 is a vertical section of the safety light of FIG. 1.
FIG. 3 is a vertical section of a safety light having a plurality of suction cups adapted for mounting the lamp on an inner wall, constituting another embodiment of the invention.

Referring to FIGS. 1 and 2 and in accordance with the present invention there is provided a novel and improved underwater illumination means comprising a safety light 20, low voltage battery 21 and maintenance charger 23. The light 20 comprises a sealed beam incandescent lamp 22 which is housed in a plastic casing 24 having an opening or window 26 to enable light to pass therethrough, the lamp face 28 spanning the casing window 26. There is further provided a sealing gasket 30 engaged with peripheral portions of the lamp 22, the casing and lamp constituting a watertight enclosure in which the lamp is mounted. The lamp has terminals 32, 34 to which there are fastened current-carrying lines 36, 38 respectively which pass through a wall of the casing and are sealed thereto in order to prevent the entry of water. The wall of the casing opposite the window carries a suction cup 40 to enable quick mounting of the casing 24 and lamp 22 to the inside wall or liner 16 of the pool, even while the latter is still filled with water.

Referring to FIGS. 1, 6 and 7, the current carrying lines extend upward from the lamp casing along the interior wall portion 14 of the pool to the top rim, where they pass beneath the railing or saddle member 18 and extend to a weathertight housing 42 carrying the battery 21. The lines 36, 38 are sealed where they enter the housing 42 so as to prevent the entrance of moisture.

By the present invention, the battery is characterized by a given nominal output voltage of a sufficiently low magnitude so as to present no shock hazard to personnel inadvertently coming in contact with current carrying portions of the lines 36, 38 and lamp.

Referring now particularly to FIGS. 6 and 7, in accordance with the present invention, there is provided a unique safety means for disconnecting the current carrying leads 36, 38 from the battery 21 and for connecting the latter with the charger 23. The safety means comprises a male electrical connector fitting 44 connected with the battery, a mating female connector fitting 46 connected with the current carrying lines 36, 38 extending to the lamp and an additional female connector fitting 48 connected with the charger 23 by means of a lead 52, and mating connectors 53, 55. It will be understood that the male connector fitting 44 can be mated with either the female connector fitting 46 when the battery 21 is to be used to energize the lamp 22, or with the female connector fitting 48 when the battery is to be charged from the charger 23. The male connector fitting 44 preferably has an external shell 45 to prevent inadvertent short circuiting of the prongs at such time as the fitting 44 is not connected to either female fitting. By the above arrangement, since the male connector fitting 44 is capable of accommodating only one of the female connector fittings 46, 48, the lamp 22 and current carrying leads 36, 38 can never be connected with the charger 23, and also can never be connected with the battery 21 when the latter is being charged. Thus, the lamp 22 and leads 36, 38 are completely electrically isolated from the charger 23 at all times, such that there is no shock hazard to personnel occupying the pool. Such a safety means is important to have, since the charger 23 has a line cord 50 adapted to be connected to commercial power mains. Without such safety means, there could arise a situation where a voltage having a magnitude equal to that of the power mains might appear at the charger output connector fitting 48 in the event of a malfunction of the charger or the development of a low leakage resistance between the line cord 50 and charger output line 52. However, since the charger 23 is never connected with the lamp 22 and lines 36, 38, there is provided complete electrical isolation for the latter, even in the event of a severe equipment malfunction. It will be understood that the connectors 53, 55 are adapted to remain permanently connected to one another, and that the connector 46 has a slightly different pin configuration to prevent it from being inadvertently directly plugged in to the connector 55 on the charger 23.

Referring again to FIG. 7, there is provided an overload safety device 54 connected in series with the current carrying lines 36, 38 to open the battery circuit in the event of an electrical malfunction of the lamp or short-circuit between the leads 36, 38. An on-off switch 56 controls energization of the lamp 22. As illustrated in FIG. 1, the battery 23, charger 21, and switch 56 can all be carried in a weathertight housing 42, which can have a hinged lid 58 to permit easy access to the contents thereof.

Another embodiment of the invention is illustrated in FIG. 3, wherein an underwater light designated 20a is shown, the light comprising a sealed beam incandescent lamp 22 carried in a plastic watertight casing 24a of modified configuration. The lamp 22 has terminals 32a and 34a connected with current carrying leads 36 and 38, which pass through the wall 39 of the casing and are sealed thereto to prevent water from entering. The casing has a window 26a, and an annular abutment 25 providing a seat for the lamp 22 and constituting mounting means therefor. A sealing gasket 30a and potting compound 63 secure the lamp 22 in water-tight fashion in the casing 25. The gasket 30a disposed between the peripheral portion of the lamp and the casing provides a watertight seal therebetween. In this embodiment the casing carries four suction cups, two of which are shown and designated 60, 62, although in addition, three cups have been found to provide satisfactory mounting capability for the casing and lamp. The underwater light illustrated in FIG. 3 can be mounted on the pool wall in a manner analogous to that of the light 20 in FIG. 1.

Yet another embodiment of the invention is illustrated in FIGS. 4 and 5, showing an underwater light 64 adapted to be mounted in a hole in the wall of a pool. The incandescent lamp 22b is secured in a plastic casing 24b by means of a sealing gasket 30. Opposite the window 26 is an aperture 66 in which there is disposed a threaded nipple 68 having a hollow bore 70. As particularly illustrated in FIG. 5, the current carrying leads 36, 38 which supply energization to the lamp from the battery 21 pass through the bore 70 of the nipple and are attached to the lamp terminals 32b, 34b respectively. The casing is mounted to the pool wall by means of a nut 72, washer 74, and two sealing gaskets 76, 78 disposed on opposite sides of the vertical wall portion 14 and inner wall or vinyl liner 16. It is to be noted that the last two embodiments of the invention illustrated in FIG. 3 and in FIGS. 4-5 respectively are to be employed with the battery, the charger and the safety means particularly illustrated in the first mentioned embodiment.

As provided by the invention, the improved method of effecting auxiliary lighting of underwater surfaces of a pool is seen to comprise the steps of fastening a sealed lamp unit to an inside wall of the pool at a point below the waterline, bringing current carrying leads from the lamp unit to the exterior of the pool and attaching the leads to a low voltage source of power to energize the lamp unit. The method includes either passing the leads upward along the inside wall of the pool and outward over the top edge of the pool wall, or passing the leads through the wall of the pool.

From the above it can be seen that I have provided an improved means for illuminating underwater areas of swimming pools, the means being both extremely simple and completely safe and at no time presenting shock hazard to personnel in the pool. The unit is reliable in operation and is virtually maintenance free.

Variations and modifications are possible without departing from the spirit of the invention.

I claim:

1. An underwater safety light for illuminating water-filled pools, comprising in combination:
 a. a sealed beam incandescent lamp,
 b. a cup-shaped molded plastic casing having a wide mouth constituting a window for passing light therethrough,
 c. means for mounting the lamp in the casing in a position to direct light outward through the casing window, the face of said lamp spanning the window of the casing,
 d. said casing constituting an enclosure in which the lamp is mounted,
 e. current carrying lines passing through a wall of the casing, said lines being connected to the lamp to effect energization thereof, f. means carried by said casing for mounting the same on an inside wall of the pool below the waterline thereof,
g. a battery disposed at a location exterior of the pool,
h. said current carrying lines extending to the battery to receive energization therefrom,
i. said battery being characterized by an output voltage of a sufficiently low magnitude so as to present no shock hazard to personnel inadvertently coming in contact with current carrying portions of said lines and lamp,
j. means for charging the battery,
k. a line cord leading from said battery and connected with said charging means to supply energy to the battery, and
l. safety means adapted to disconnect said current carrying lines from said battery and to connect the latter with the charger, whereby said lamp and current carrying lines are thereby positively electrically isolated from the charger and the battery whenever a circuit is established between the charger and the battery.

2. The invention as set forth in claim 1, wherein:
a. said mounting means for the casing comprises a threaded nipple projecting from the same, said nipple being adapted to pass through a hole in a wall of the pool,
b. said nipple having a longitudinal bore,
c. a nut carried by said nipple, and
d. a gasket carried by said nipple for engagement with peripheral portions of the hole in said wall, constituting a watertight seal around the nipple,
e. said current carrying lines extending through said longitudinal bore of the nipple.

3. The invention as set forth in claim 1, and further including:
a. an electrical overload safety device connected with the current carrying lines to open the circuit thereof in the event of an electrical malfunction downstream of the device, and
b. an on-off switch connected with said current carrying lines and located exteriorly of the walls of the pool, for controlling energization of said lamp.

4. The invention as set forth in claim 1, wherein:
a. said safety means comprises a male electrical connector fitting connected with said battery,
b. a mating female connector fitting connected with said current carrying lines extending to the lamp, and
c. an additional female connector fitting connected with said charger, said male connector fitting being capable of accommodating only one of said female fittings at a time, whereby shock hazard to surrounding personnel is eliminated.

5. The invention as set forth in claim 1, wherein:
a. said mounting means for the casing comprises a suction cup and an integral stud on the casing to which the cup is press-fitted, said cup being adapted to sealingly engage an inside wall of the pool.

6. The invention as set forth in claim 5, and further including:
a. a vertical wall portion of the pool to which the suction cup is attached, and
b. a saddle member attached to and overlying the top edge of said vertical wall portion,
c. said current carrying lines extending upward from the casing along the interior of said vertical wall portion and extending between the top rim of the latter and said saddle member.

7. The invention as set forth in claim 5, and further including:
a. an additional suction cup and stud on and integral with the casing, said cup being press-fitted to the stud and adapted for engaging said inside wall to supplement the support provided by the first mentioned suction cup.

8. The invention as set forth in claim 1, and further including:
a. a peripheral exterior skirt integral with the casing and surrounding the cup formation thereof, thereby to constitute in effect a cup having double side walls,
b. said mounting means comprising suction cups mounted in the space formed by the double side walls of the casing.

9. The invention as set forth in claim 8, wherein:
a. the inner and outer side walls of the casing are respectively convergent and divergent, forming an annular space therebetween having a wide mouth at the rear of the casing in which the suction cups are disposed.

* * * * *